United States Patent
Janiszewski et al.

[11] Patent Number: 5,960,386
[45] Date of Patent: *Sep. 28, 1999

[54] METHOD FOR ADAPTIVELY CONTROLLING THE PITCH GAIN OF A VOCODER'S ADAPTIVE CODEBOOK

[76] Inventors: Thomas John Janiszewski, 9 Westway, Clinton, N.J. 08809; Michael D. Turner, 33 Elm #9, Madison, N.J. 07940

[*] Notice: This patent issued on a continued prosecution application filed under 37 CFR 1.53(d), and is subject to the twenty year patent term provisions of 35 U.S.C. 154(a)(2).

[21] Appl. No.: 08/649,554

[22] Filed: May 17, 1996

[51] Int. Cl.$^6$ .................................................. G10L 5/00
[52] U.S. Cl. ........................... 704/207; 704/205; 704/206
[58] Field of Search .................. 395/2.14, 2.16, 395/2.17, 2.28, 2.31

[56] References Cited

U.S. PATENT DOCUMENTS

| | | | |
|---|---|---|---|
| 4,809,334 | 2/1989 | Bhaskar | 381/49 |
| 5,018,200 | 5/1991 | Ozawa | 381/36 |
| 5,127,053 | 6/1992 | Koch | 381/31 |
| 5,142,584 | 8/1992 | Ozawa | 381/36 |
| 5,226,108 | 7/1993 | Harwick et al. | 395/2 |
| 5,305,332 | 4/1994 | Ozawa | 371/31 |
| 5,307,441 | 4/1994 | Tzeng | 395/2.31 |
| 5,479,559 | 12/1995 | Fette et al. | 395/2.16 |
| 5,495,555 | 2/1996 | Swaminathan | 395/2.16 |
| 5,506,899 | 4/1996 | Kimura | 379/387 |
| 5,623,575 | 4/1997 | Fette et al. | 395/2.74 |
| 5,651,091 | 7/1997 | Chen | 395/2.32 |
| 5,657,419 | 8/1997 | Yoo et al. | 395/2.32 |

OTHER PUBLICATIONS

Speech and audio coding for wireless and network applications, edited by Bishnu S. Atal, Vladimir Cuperman, and Allen Gersho, 1993, by Kluwer Academic Publishers.

"A Correction for the instability problem," Westgate Lakas Hotel, Orlando, Florida, Apr. 23, 1996.

*Primary Examiner*—David D. Knepper
*Assistant Examiner*—Michael N. Opsasnick

[57] ABSTRACT

A pitch gain of the adaptive codebook portion of a vocoder's encoder is monitored to determine when an instability condition is about to occur by examining a pitch gain value and an averaged pitch gain value. When an instability is likely, the output of a gain control unit is set to an adaptive gain control value. When an instability is unlikely, the gain control unit passes the pitch gain to its output unmodified.

15 Claims, 3 Drawing Sheets

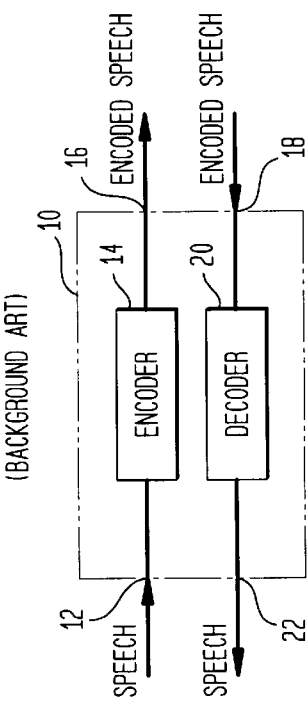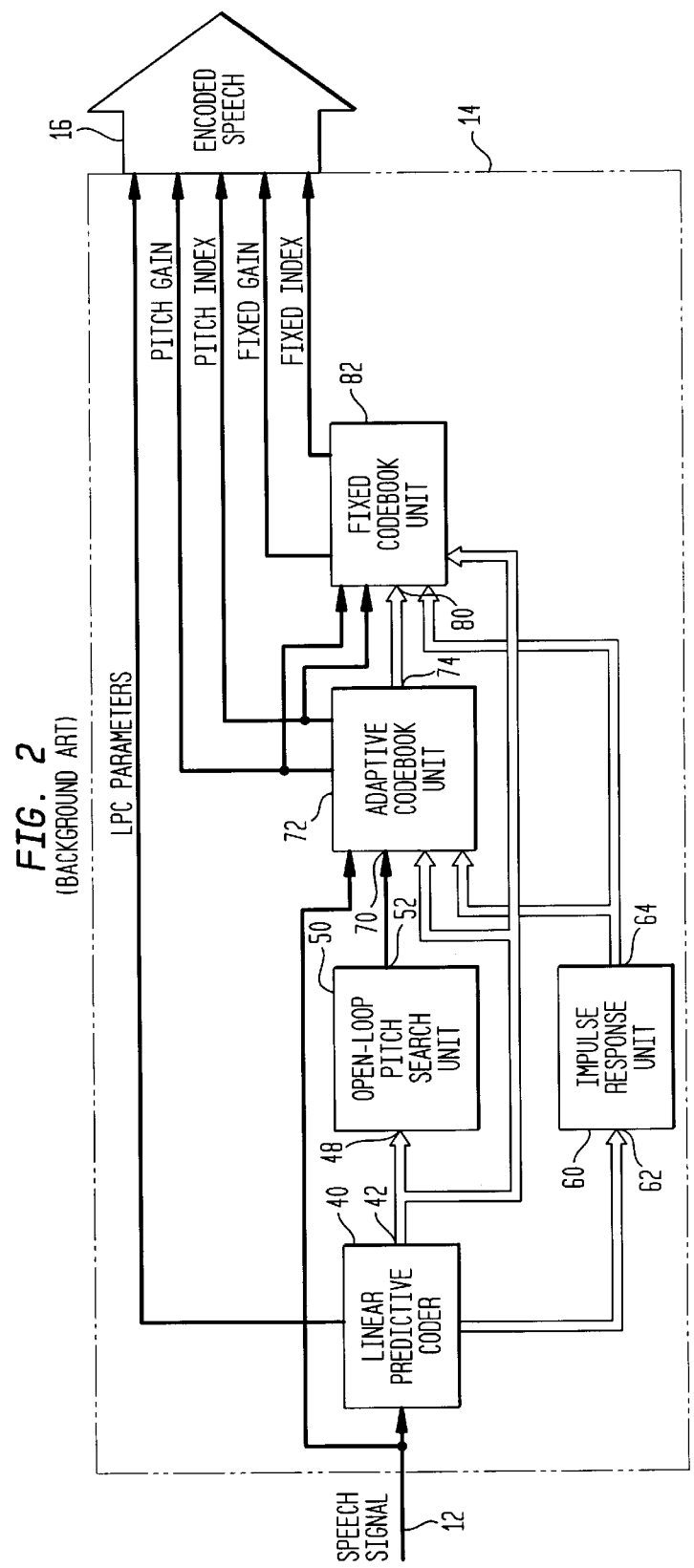

METHOD FOR ADAPTIVELY CONTROLLING THE PITCH GAIN OF A VOCODER'S ADAPTIVE CODEBOOK

BACKGROUND OF THE INVENTION

1. Field of the Invention

The present invention relates to communications; more specifically, voice encoding.

2. Description of the Related Art

A voice encoder (vocoder) is used to encode voice signals so as to minimize the amount of bandwidth that is used for transmitting over communication channels. It is important to minimize the amount of bandwidth used per communication channel so as to maximize the number of channels available within a given range of spectrum. Present vocoders using an adaptive codebook structure, such as those in the class of code excited linear predictive (CELP) vocoders, encounter an instability problem when receiving periodic, sinusoidal or tonal inputs coupled with a communications channel error. Since all communication channels experience errors, this type of problem manifests itself relatively frequently for the above inputs. For example, when a DTMF (Dual Tone Multifrelquency) signal is received with errors, many vocoders become unstable and produce an output that exhibits amplitude oscillation.

SUMMARY OF THE INVENTION

An embodiment of the present invention solves the aforementioned problem by monitoring a gain used in the adaptive codebook portion of the encoder of a vocoder. This gain is monitored to determine when an instability condition is about to occur. When this condition is detected, the gain is controlled using adaptive parameters so that instability is avoided.

BRIEF DESCRIPTION OF THE DRAWING

FIG. 1 is a block diagram of a typical vocoder,

FIG. 2 illustrates the major functions of encoder 14 of vocoder 10;

DETAILED DESCRIPTION OF THE INVENTION

Figure 3:
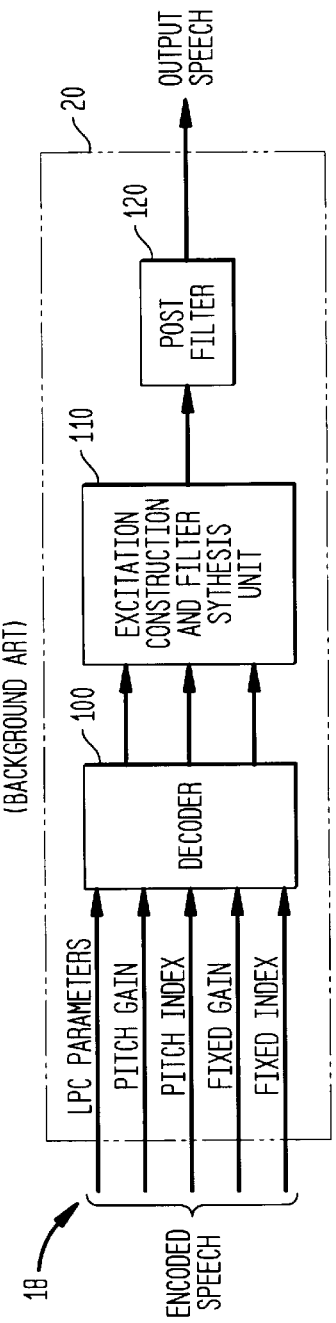
FIG. 3 is a functional block diagram of decoder 20 of vocoder 10.

FIG. 1 illustrates a block diagram of a typical vocoder. Vocoder 10 receives digitized speech on input 12. The digitized speech is an analog speech signal that has been passed through an analog to digitized converter, and has been broken into frames where each frame is typically on the order of 20 milliseconds. The signal at input 12 is passed to encoder section 14 which encodes the speech so as decrease the amount of bandwidth used to transmit the speech. The encoded speech is made available at output 16. The encoded speech is received by the decode section of a similar vocoder at the other end of a communication channel. The decoder at the other end of the communication channel is similar or identical to the decoder portion of vocoder 10. Encoded speech is received by vocoder 10 through input 18, and is passed to decoder section 20. Decoder section 20 uses the encoded signals received from the transmitting vocoder to produce digitized speech at output 22.

Vocoders are well known in the communications arts. For example, vocoders are described in "Speech and audio coding for wireless and network applications," edited by Bishnu S. Atal, Vladimir Cuperman, and Allen Gersho, 1993, by Kluwer Academic Publishers. Vocoders are widely available and manufactured by companies such as Qualcomm Incorporated of San Diego, Calif., and Lucent Technologies Inc., of Murray Hill, N.J.

FIG. 2 illustrates the major functions of encoder 14 of vocoder 10. A digitized speech signal is received at input 12, and is passed to Linear predictive coder 40. Linear predictive coder 40 performs a linear predictive, analysis of the incoming speech once per frame. Linear predictive analysis is well known in the art and produces a linear predictive synthesis model of the vocal tract based on the input speech signal. The linear predictive parameters or coefficients describing this model are transmitted as part of the encoded speech signal through output 16. Coder 40 uses this model to produce a residual speech signal which represents the excitation that the model uses to reproduce the input speech signal. The residual speech signal is made available at output 42. The residual speech from output 42 is provided to input 48 of open-loop pitch search unit 50 to an input of adaptive codebook unit 72 and to fixed codebook unit 82.

Impulse response unit 60 receives the linear predictive parameters from coder 40 and generates the impulse response of the model generated in coder 40. This impulse response is used in the adaptive and fixed codebook units.

Open loop pitch search unit 50 uses the residual speech signal from coder 40 to model its pitch and provides a pitch, or what is commonly called the pitch period or pitch delay signal, at output 52. The pitch delay signal from output 52 and the impulse response signal from output 64 of impulse response unit 60 are received by input 70 of adaptive codebook unit 72. Adaptive codebook unit 72 produces a pitch gain output and a pitch index output which become part of encoded speech output 16 of vocoder 10. Output 74 of adaptive codebook unit 72 also provides the pitch gain and pitch index signals to input 80 of fixed codebook unit 82. Additionally, adaptive codebook unit 72 provides an excitation signal and an adaptive codebook target signal to input 80.

The adaptive codebook unit 72 produces its outputs using, the digitized speech signal from input 12 and the residual speech signal produced by linear predictive coder 40. Adaptive codebook unit 72 uses the digitized speech signal and linear predictive coder 40's residual speech signal to form an adaptive codebook target signal. The adaptive codebook target signal is used as an input to fixed codebook unit 82, and as an input to a computation that produces the pitch gain, pitch index and excitation outputs of adaptive codebook unit 72. Additionally, the adaptive codebook target signal, the pitch delay signal from open loop pitch search unit 50, and the impulse response from impulse response unit 60 are used to produced the pitch index, the pitch gain and excitation signals which are passed to fixed codebook unit 82. The manner in which these signals are computed is well known in the vocoder art.

Fixed codebook unit 82 uses the inputs received from input 80 to produce a fixed gain output and a fixed index output which are used as part of the encoded speech at output 16. The fixed codebook unit attempts to model the stocastic part of the linear predictive coder 40's residual speech signal. A target for the fixed codebook search is produced by determining the error between the current adaptive codebook target signal and the residual speech signal. The fixed codebook search produces the fixed gain and fixed index signal for excitation pulses so as to minimize this error. The manner in which the fixed gain and fixed index signals are computed using the outputs from adaptive codebook unit 72 are well known in the vocoder art.

FIG. 3 illustrates a functional block diagram of decoder 20 of vocoder 10. Encoded speech signals are received at input 18 of decoder 20. The encoded speech signals are received by decoder 100. Decoder 100 produces fixed and adaptive code vectors corresponding to the fixed index and pitch index signals, respectively. These code vectors are passed to the excitation construction portion of unit 110 along with the pitch gain and the fixed gain signals. The pitch gain signal is used to scale the adaptive vector which was produced using the pitch index signal, and the fixed gain signal is used to scale the fixed vector which was obtained using the fixed index signal. Decoder 100 passes the linear predictive code parameters to the filter or model synthesis section of unit 110. Unit 110 then uses the scaled vectors to excite the filter that is synthesized using the linear predictive coefficients produced by linear predictive coder 40, and produces an output signal which is representative of the digitized speech originally received at input 12. Optionally, post filter 120 may be used to shape the spectrum of the digitized speech signal that is produced at output 20.

The functional block diagrams can be implemented in various forms. Each block can be implemented individually using microprocessors or microcomputers, or they can be implemented using a single microprocessor or microcomputer. It is also possible to implement each or all of the functional blocks using programmable digital signal processing devices or specialized devices received from the aforementioned manufacturers or other semiconductor manufacturers.

Figure 4:
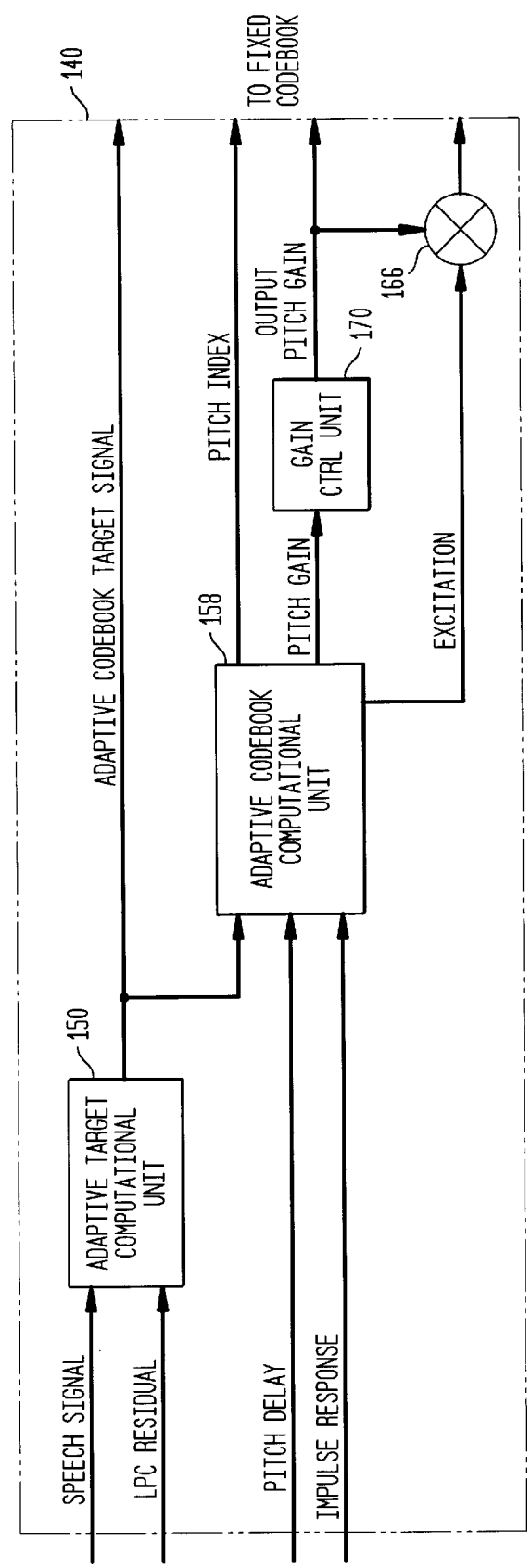
FIG. 4 is a functional block diagram of an adaptive codebook unit.

FIG. 4 illustrates a functional block diagram of adaptive codebook unit 140 that comprises an embodiment of the present invention. Adaptive codebook unit 140 would be used in place of adaptive code book unit 72 of FIG. 2. As mentioned earlier, the adaptive codebook receives the digitized speech signal, linear predictive coder 40's residual speech signal, the pitch delay signal, and the output of impulse response unit 60. Adaptive codebook unit 140 includes adaptive target computational unit 150. Unit 150 uses the digitized speech signal and the residual signal From linear predictive coder 40 to produce the adaptive codebook target signal which is passed to fixed codebook unit 82. The adaptive codebook target signal, the pitch delay signal 50 and the impulse response signal of open-100p pitch search unit are used by adaptive codebook computational unit 158 to produce a pitch index signal, a pitch gain signal, and an excitation signal which are eventually passed to fixed codebook unit 82. The aforedescribed instabilities are corrected using gain control unit 170. Gain control unit 170 monitors the value of the pitch gain signal from unit 158 and produces a new pitch gain signal when necessary to avoid the aforementioned instability problems. The pitch gain signal from unit 170 is used in scaler 166 to scale the excitation signal before passing it to the fixed codebook unit 82.

Figure 5:
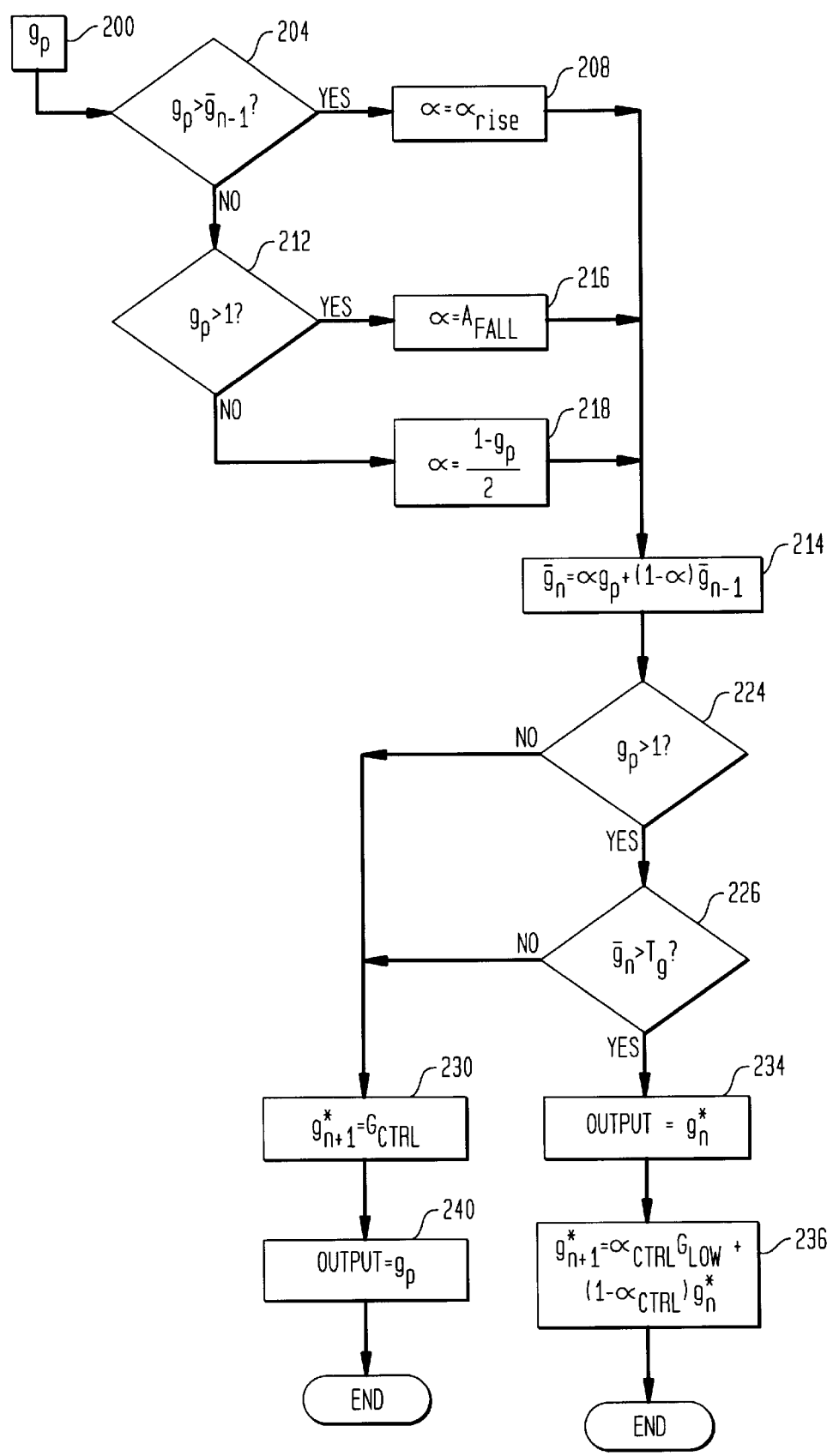
FIG. 5 illustrates the steps executed by gain control unit 170.

FIG. 5 illustrates steps executed by gain control unit 170. In step 200 the pitch gain signal, $g_p$ is received by gain control unit 170. In step 204, the gain signal $g_p$ is compared with a threshold signal $\bar{g}_{n-1}$. The signal $\bar{g}_{n-1}$ is initialized at 0. If the gain $g_p$ is greater than the threshold signal $\bar{g}_{n-1}$, step 208 is executed, and if the signal is not greater, step 212 is executed. Step 208 sets averaging constant $\alpha$ equal to $\alpha_{rise}$ and then calculation step 214 is executed to calculate the updated threshold value $\bar{g}_n$. A typical value for $\alpha_{rise}$ is 0.04. Returning to step 204, if the received signal $g_p$ is not greater than threshold value $\bar{g}_{n-1}$, step 212 is executed. In step 212, the received signal $g_p$ is compared to the value 1. If it is greater than 1, step 216 is executed, and if it is not greater than 1, step 218 is executed. Step 216 sets averaging constant $\alpha$ equal to $A_{fall}$, and in step 218 averaging constant $\alpha$ is set equal to $1-g_p/2$. A typical value for $A_{fall}$ is 0.02 In any event, after the execution of steps 208, 216 or 218, step 214 is executed. In step 214, the new threshold value $\bar{g}_n$ is calculated. The value $\bar{g}_n$ is formed using what is essentially an exponential time averaging function. The value $\bar{g}_n$ is equal to $\alpha g_p + (1-\alpha)\bar{g}_{n-1}$.

After calculating the new threshold value of $\bar{g}_n$, step 224 is executed. In step 224 the pitch gain signal $g_p$ is compared with 1. If it is greater than 1, step 226 is executed, and if it is less than 1, step 230 is executed. In step 226, new threshold value $\bar{g}_n$ is compared with a fixed threshold $T_g$. A typical value for $T_g$ is 1.0. If value $\bar{g}_n$ is greater than the threshold value $T_g$, step 234 is executed, and if it is not greater than the threshold value $T_g$, step 230 is executed. In step 234, the control gain value $g_n^*$ is provided at the output of gain control unit 170. The initial value of $g_n^*$ is typically set equal to 0.95. In step 236, the value of $g_n^*$ is updated by setting $g_{n+1}^*$ equal to $\alpha_{ctrl}G_{low} + (1-\alpha_{ctrl})g_n^*$. It is preferable to set the value $\alpha_{ctrl}$ to 0.5, and the value $G_{low}$ to 0.9. Returning to steps 224 and 226, step 230 is executed after either steps 224 or 226. In step 230, $g_{n+1}^*$ is set equal to $G_{ctrl}$, and then in step 240 the value of $g_p$ is provided at the output of gain control unit 170. A preferable value for $G_{ctrl}$ is 0.95.

In summary, steps 204 through 214 are used to calculate the new value of $\bar{g}$. In steps 208, 216 and 218, a value for the averaging constant $\alpha$ is determined. And then in step 214 that value of a is used in combination with the previous value of $\bar{g}$ to produce the new or updated value of $\bar{g}$.

In the steps following 214, it is determined whether the pitch gain, $g_p$, received from codebook computation unit 158 should be modified by gain control unit 170. In steps 224 and 226 the present pitch gain value, $g_p$, and the averaged pitch gain value, $\bar{g}_n$, are examined to determine if an instability is likely. If it is determined that an instability is likely, the output of gain control unit 170 is set to an adaptive gain control value $g_n^*$. This output is used in place of the pitch gain $g_p$ received from codebook computation unit 158. In step 236 the adaptive gain control $g_n^*$ is updated. If it is determined in steps 224 and 226 that an instability condition is not likely, the pitch gain received from codebook computation unit 158 is passed unmodified to the output by gain control unit 170. In addition, if it is determined that an instability is not likely, the updated adaptive gain control $g_{n+1}^*$ is set equal to a fixed value $G_{ctrl}$. The computation or process illustrated by FIG. 5 can be carried out on a frame-by-frame basis or on a more frequent basis depending on the vocoder being used.

The invention claimed is:

1. A method of operating a vocoder in order to avoid an instability problem when receiving periodic, sinusoidal or tonal inputs coupled with a communications error, said method comprising the steps of:

providing analytical circuitry including an adaptive codebook unit and a pitch gain control unit;

receiving a digitized speech signal in said analytical circuitry;

compressing said digitized speech signal using said analytical circuitry by deriving parameter signals representative of said digitized speech signal and by forming a residual speech signal;

receiving at least said parameter signals at said adaptive codebook unit;

outputting a pitch gain from said adaptive codebook unit based upon at least said parameter signals;

receiving said pitch gain at said pitch gain control unit;

monitoring said pitch gain using said pitch gain control unit by comparing said pitch gain to a threshold value in order to determine when an instability problem is about to occur;

setting said pitch gain equal to an adaptive modified pitch gain if said pitch gain exceeds said threshold value; and transmitting at least said pitch gain and said residual speech signal as a compressed speech signal representative of said digitized speech signal.

2. A method of operating a vocoder in order to avoid an instability problem when receiving periodic, sinusoidal or tonal inputs coupled with a communications error, said method comprising the steps of:

provid ing analytical circuitry including an adaptive codebook unit and a pitch gain control unit;

receiving a digitized speech signal in said analytical circuitry;

compressing said digitized speech signal using said analytical circuitry by deriving parameter signals representative of said digitized speech signal and by forming a residual speech signal;

receiving at least said parameter signals at said adaptive codebook unit;

outputting a pitch gain from said adaptive codebook unit based upon at least said parameter signals;

receiving said pitch gain at said pitch gain control unit;

monitoring said pitch gain using said pitch gain control unit by comparing said pitch gain to a threshold value in order to determine when an instability problem is about to occur;

setting said pitch gain equal to an adaptive modified pitch gain if said pitch gain crosses said threshold value; and transmitting at least said pitch gain and said residual speech signal as a compressed speech signal representative of said digitized speech signal.

3. The method of claim 2, wherein a new adaptive modified pitch gain is formed by performing a weighted sum of a constant and the adaptive modified pitch gain.

4. The method of claim 3, wherein the weighted sum is formed in accordance with $g_{n+1}^* = \alpha_{ctrl} G_{low} + (1-\alpha_{ctrl}) g_n^*$ where $g_{n+1}^*$ is the new adaptive modified pitch gain, $g_n^*$ is the adaptive modified pitch gain, and $\alpha_{ctrl}$ and $G_{low}$ are constants.

5. A method of operating a vocoder in order to avoid an instability problem when receiving periodic, sinusoidal or tonal inputs coupled with a communications error, said method comprising the steps of:

providing analytical circuitry including an adaptive codebook unit and a pitch gain control unit;

receiving a digitized speech signal in said analytical circuitry;

compressing said digitized speech signal using said analytical circuitry by deriving parameter signals representative of said digitized speech signal and by forming a residual speech signal;

receiving at least said parameter signals at said adaptive codebook unit;

outputting a pitch gain from said adaptive codebook unit based upon at least said parameter signals;

calculating an average pitch gain;

receiving said pitch gain and said average pitch gain at said pitch gain control unit;

monitoring said pitch gain using said pitch gain control unit by comparing said pitch gain to a first threshold value and monitoring said average pitch gain using said pitch gain control unit by comparing said average pitch gain to a second threshold value in order to determine when an instability problem is about to occur;

setting said pitch gain equal to an adaptive modified pitch gain if said pitch gain crosses said first threshold value and said average pitch gain crosses said second threshold value; and transmitting at least said pitch gain and said residual speech signal as a compressed speech signal representative of said digitized speech signal.

6. The method of claim 5, wherein the average pitch gain is calculated by performing a weighted sum of the pitch gain and a prior average pitch gain.

7. The method of claim 6, wherein the weighted sum is formed in accordance with $\bar{g}_n = \alpha g_p + (1-\alpha) \bar{g}_n$ where $\bar{g}_n$ is the average pitch gain, $g_p$ is the pitch gain, $\bar{g}_{n-1}$ is the prior average pitch gain and $\alpha$ is a weighting variable.

8. The method of claim 7, wherein $\alpha$ is a constant.

9. The method of claim 7, wherein $\alpha = 1 - g_p/2$.

10. A method of operating a vocoder in order to avoid an instability problem when receiving periodic, sinusoidal or tonal inputs coupled with a communications error, said method comprising the steps of:

providing analytical circuitry including an adaptive codebook unit and a pitch gain control unit;

receiving a digitized speech signal in said analytical circuitry;

compressing said digitized speech signal using said analytical circuitry by deriving parameter signals representative of said digitized speech signal and by forming a residual speech signal;

receiving at least said parameter signals at said adaptive codebook unit;

outputting a pitch gain from said adaptive codebook unit based upon at least said parameter signals;

calculating an average pitch gain;

receiving said pitch gain and said average pitch gain at said pitch gain control unit;

monitoring said pitch gain using said pitch gain control unit by comparing said pitch gain to a first threshold value and monitoring said average pitch gain using said pitch gain control unit by comparing said average pitch gain to a second threshold value in order to determine when an instability problem is about to occur;

setting said pitch gain equal to an adaptive modified pitch gain if said pitch gain crosses said first threshold value and said average pitch gain crosses said second threshold value;

forming a new adaptive modified pitch gain by performing a first weighted sum of a constant and the adaptive modified pitch gain; and transmitting at least said pitch gain and said residual speech signal as a compressed speech signal representative of said digitized speech signal.

11. The method of claim 10, wherein the first weighted sum is formed in accordance with $g_{n+1}^* = \alpha_{ctrl} G_{low} + (1-\alpha_{ctrl}) g_n^*$ where $g_{n+1}^*$ is the new adaptive modified pitch gain, $g_n^*$ is the adaptive modified pitch gain, and $\alpha_{ctrl}$ and $G_{low}$ are constants.

12. The method of claim 10, wherein the average pitch gain is calculated by performing a second weighted sum of the pitch gain and a prior average pitch gain.

13. The method of claim 12, wherein the second weighted sum is formed in accordance with $\bar{g}_n = \alpha g_p + (1-\alpha) \bar{g}_n$ where $\bar{g}_n$ is the average pitch gain, $g_p$ is the pitch gain, $\bar{g}_{n-1}$ is the prior average pitch gain and $\alpha$ is a weighting variable.

14. The method of claim 13, wherein $\alpha$ is a constant.

15. The method of claim 13, wherein $\alpha = 1 - g_p/2$.

* * * * *